(12) United States Patent
Rutkowski

(10) Patent No.: US 7,520,201 B1
(45) Date of Patent: Apr. 21, 2009

(54) SPARK TRAP DEVICE

(76) Inventor: Ronald J. Rutkowski, 4013 Main St., Grasonville, MD (US) 21638

( * ) Notice: Subject to any disclaimer, the term of this patent is extended or adjusted under 35 U.S.C. 154(b) by 182 days.

(21) Appl. No.: 11/548,967

(22) Filed: Oct. 12, 2006

(51) Int. Cl.
*B26D 7/06* (2006.01)

(52) U.S. Cl. ............................ 83/109; 83/165; 83/490

(58) Field of Classification Search ............... 83/98, 83/100, 471.3, 490, 109, 165, 166
See application file for complete search history.

(56) References Cited

U.S. PATENT DOCUMENTS

| | | | |
|---|---|---|---|
| 3,401,724 A | | 9/1968 | Kreitz |
| 4,779,603 A | * | 10/1988 | Crocetti .................. 125/13.01 |
| 5,172,680 A | * | 12/1992 | Swan ........................ 125/12 |
| 5,461,956 A | * | 10/1995 | Petersen et al. ............... 83/221 |
| D372,484 S | | 8/1996 | Price et al. |
| 5,931,072 A | | 8/1999 | Shibata |
| 6,212,985 B1 | * | 4/2001 | Payne ...................... 83/471.2 |
| 6,422,228 B1 | * | 7/2002 | Latham .................. 125/13.01 |
| 6,796,890 B1 | * | 9/2004 | Goldrick .................... 451/454 |
| 2002/0083939 A1 | | 7/2002 | Latham |
| 2004/0118255 A1 | | 6/2004 | Peters |
| 2005/0205075 A1 | | 9/2005 | Guth |

\* cited by examiner

*Primary Examiner*—Kenneth Peterson
*Assistant Examiner*—Omar Flores-Sánchez

(57) ABSTRACT

A spark trap device for containing sparks and metal filings generated when a chop saw cuts a metal includes a base plate receiving a chop saw to collect sparks and metal filings from the chop saw. Each of a pair of channels is coupled to opposing sides of the base plate and the chops saw is positioned between the channels. Each of the channels has one of a pair side walls coupled thereto and extending upwardly therefrom. A rear wall is coupled to and extends upwardly from a rear end of the base plate and is coupled to the side walls. A lid is hingedly coupled to the rear wall. The lid extends between the side walls when the lid is positioned over the side walls. The rear wall, the side walls and the lid deflect the sparks towards the base plate when the chop saw is in use.

4 Claims, 5 Drawing Sheets

SPARK TRAP DEVICE

BACKGROUND OF THE INVENTION

1. Field of the Invention

The present invention relates to saw enclosures and more particularly pertains to a new saw enclosure for containing sparks and metal filings generated when a chop saw cuts a metal work piece.

2. Description of the Prior Art

The use of saw enclosures is known in the prior art. While these devices fulfill their respective, particular objectives and requirements, the need remains for a device that has certain improved features that allow for a chop saw to be easily inserted into the device to cover a portion of the chop saw to collect sparks and metal filings produced during use of the chop saw. Additionally, a lid of the device may engage a blade guard of the chop saw to allow the lid to be raised when the blade guard is in a raised position.

SUMMARY OF THE INVENTION

The present invention meets the needs presented above by generally comprising a base plate receiving a chop saw. The base plate collects sparks and metal filings from the chop saw. Each of a pair of channels is coupled to opposing sides of the base plate; wherein the chop saw is positioned between the channels when the chop saw is positioned on the base plate. Each of the channels has one of a pair side walls coupled thereto and extending upwardly therefrom. Each of the side walls are positioned adjacent a rear portion of the chop saw when the chop saw is positioned on the base plate. A rear wall is coupled to and extending upwardly from a rear end of the base plate. The rear wall is coupled to the side walls. The rear wall and the side walls deflect the sparks towards the base plate when the chop saw is used to cut a metal work piece. A lid is hingedly coupled to the rear wall. The lid extends between the side walls when the lid is positioned over the side walls. The lid extends over the rear portion of the chop saw to deflect sparks onto the base plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
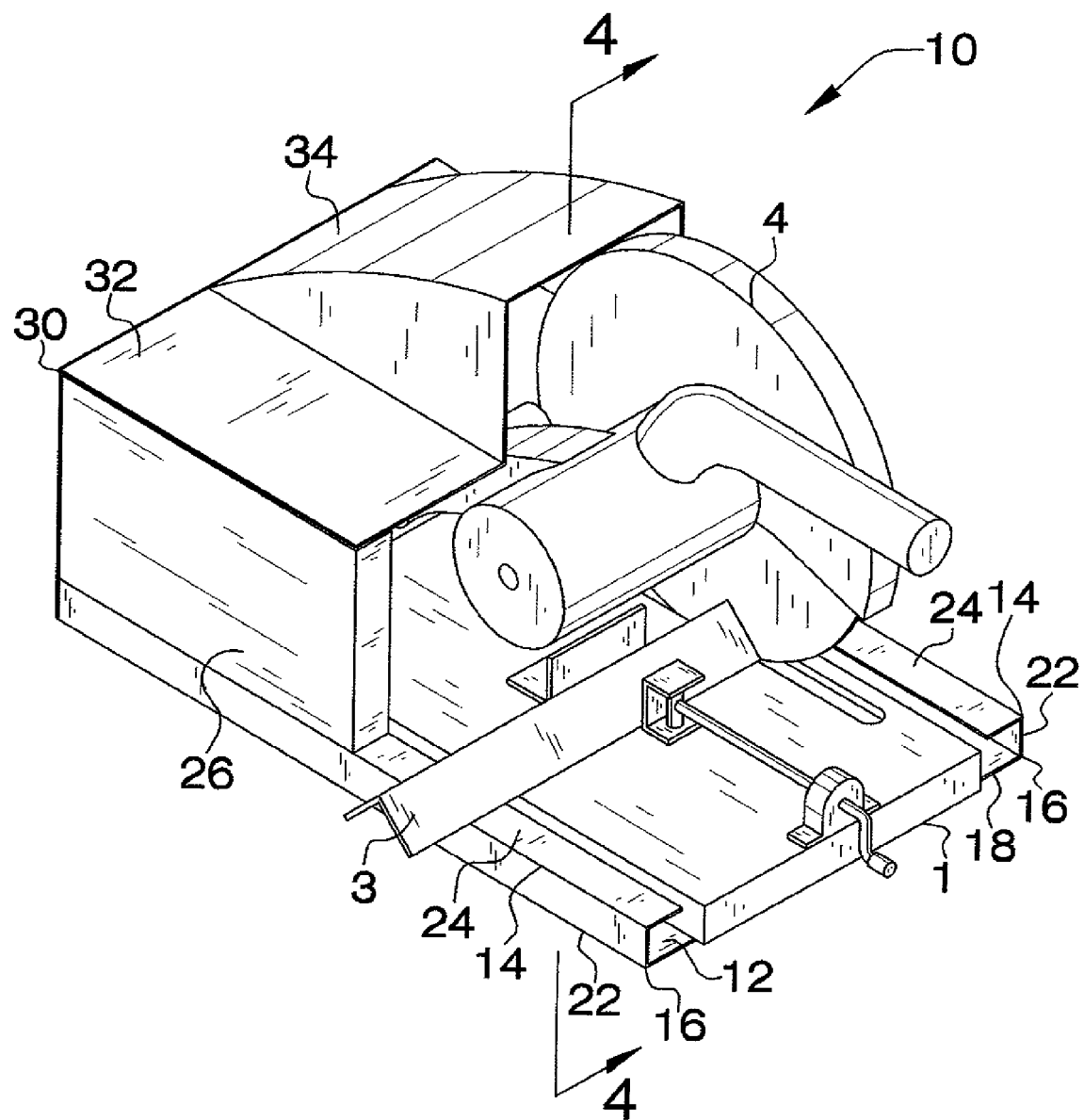
FIG. 1 is a perspective view of a spark trap device according to the present invention in use.
Figure 2:
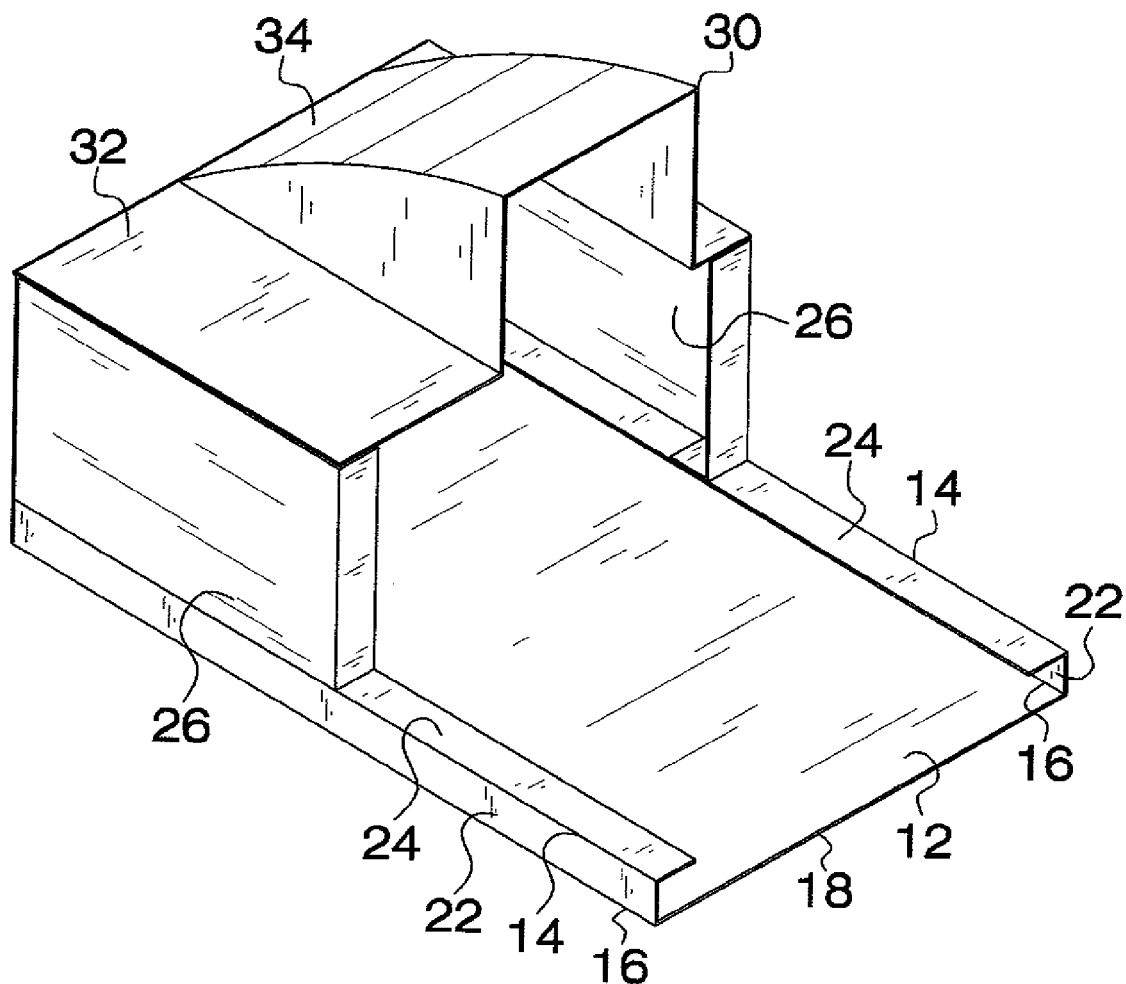
FIG. 2 is a perspective view of the present invention.
Figure 3:
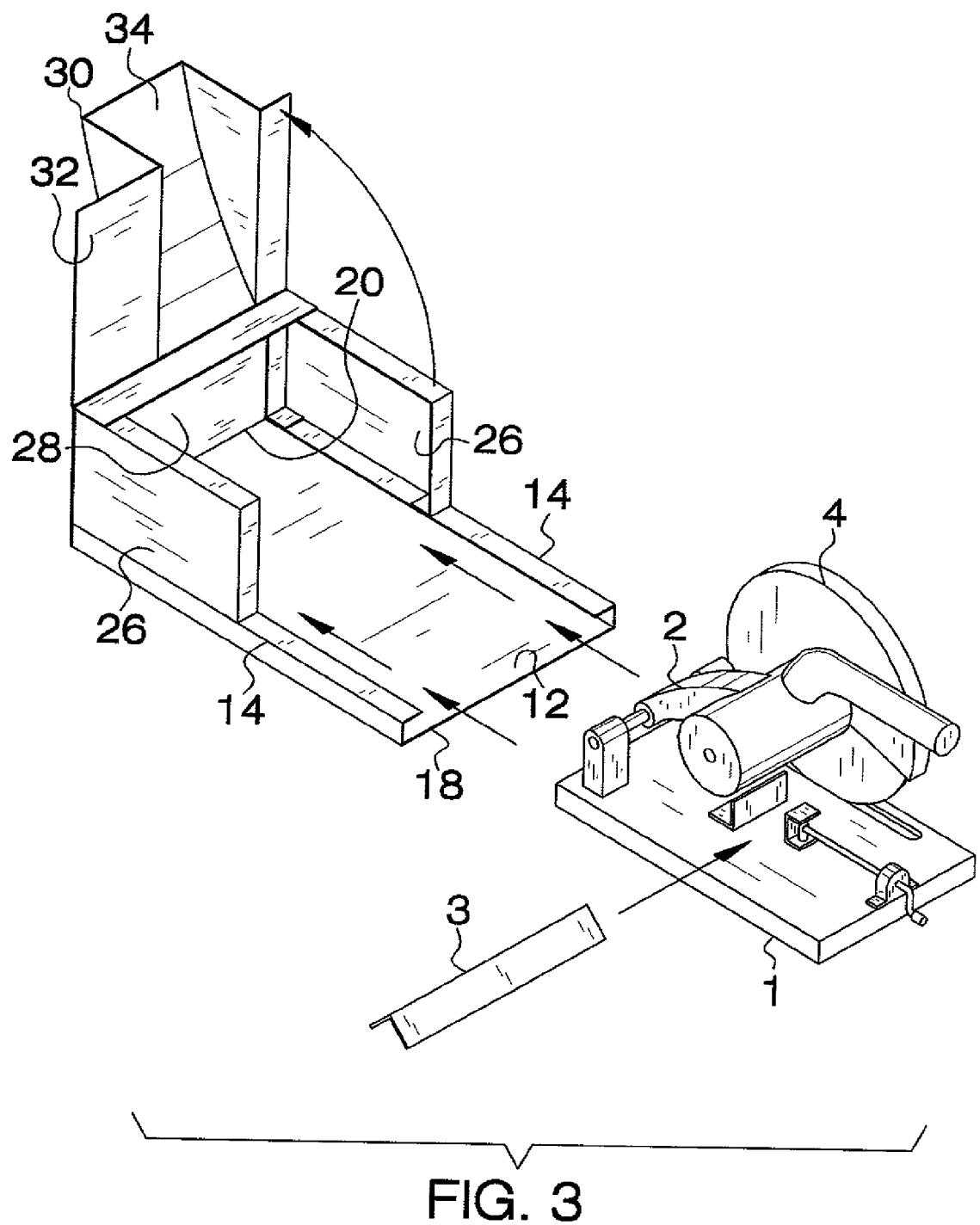
FIG. 3 is an exploded perspective view of the present invention.
Figure 4:
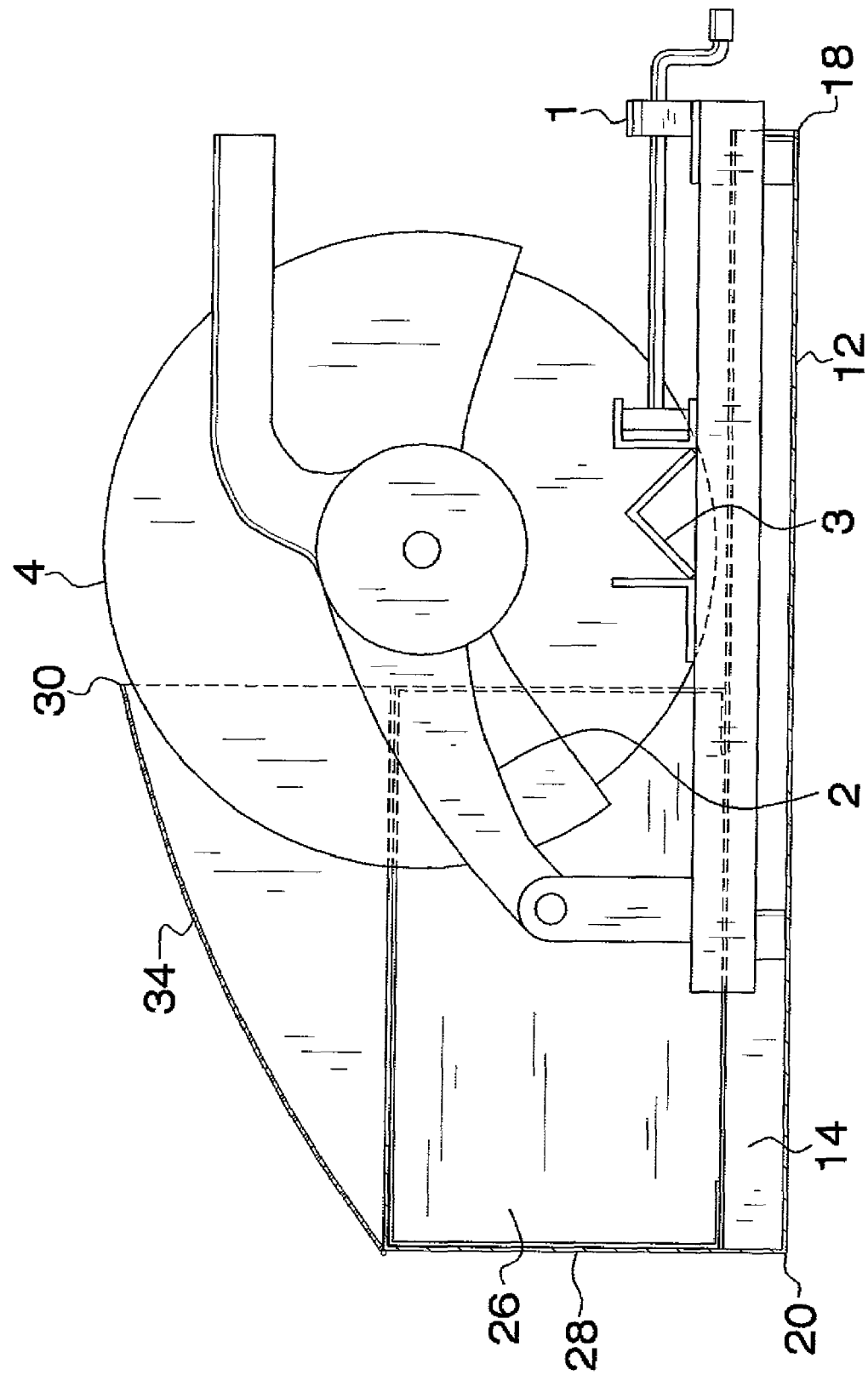
FIG. 4 is a cross-sectional view of the present invention taken along line 4-4 of FIG. 1.
Figure 5:
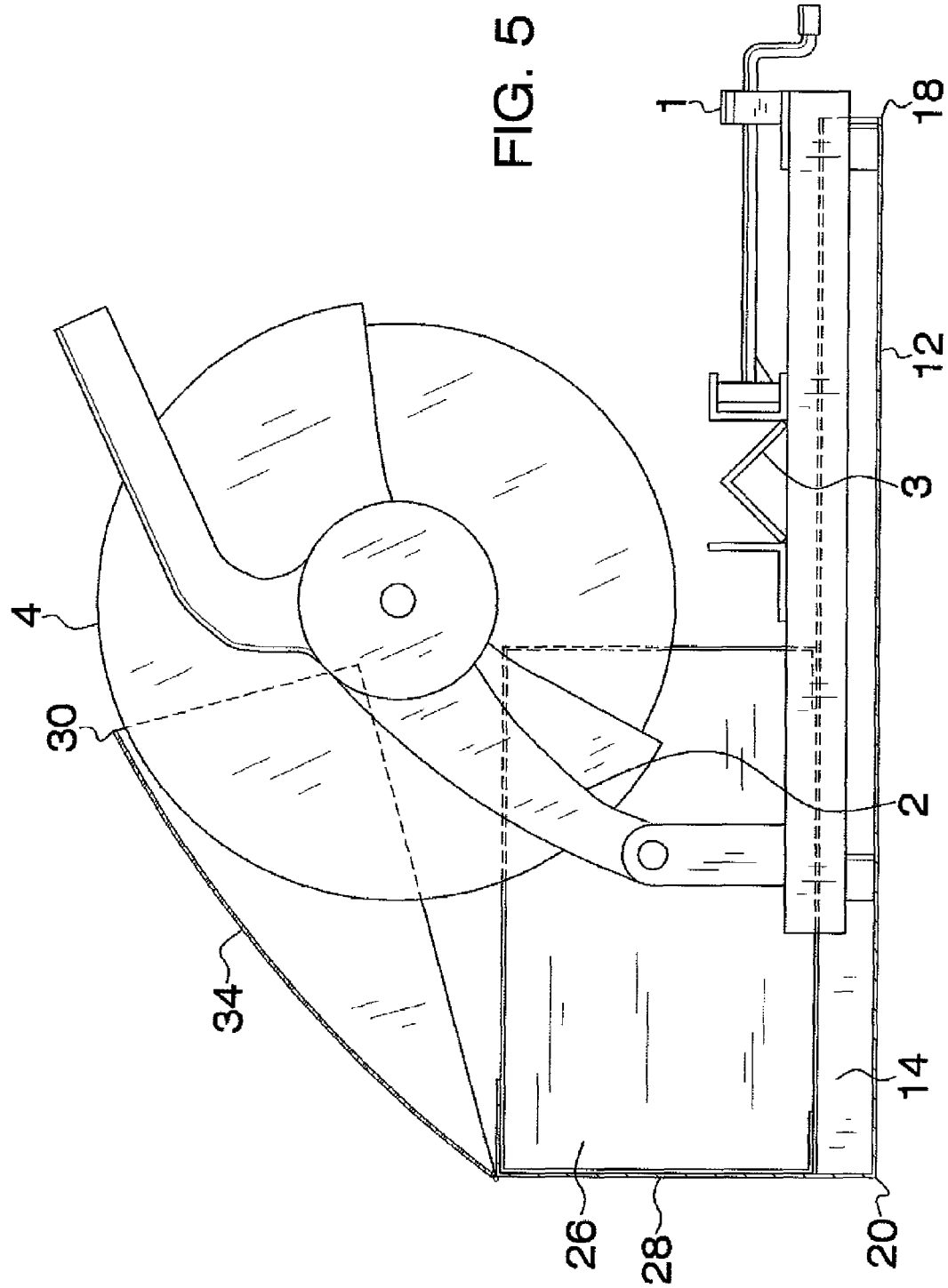
FIG. 5 is a cross-sectional view of the present invention as shown in FIG. 4 with the blade guard of the chop saw in the raised position.

With reference now to the drawings, and in particular to FIGS. 1 through 5 thereof, a new saw enclosure embodying the principles and concepts of the present invention and generally designated by the reference numeral 10 will be described.

As best illustrated in FIGS. 1 through 5, the spark trap device 10 generally comprises a base plate 12 receiving a chop saw 1. The base plate 12 collects sparks and metal filings from the chop saw 1. Each of a pair of channels 14 is coupled to opposing sides 16 of the base plate 12, wherein the chop saw 1 is positioned between the channels 14 when the chop saw 1 is positioned on the base plate 12. Each of the channels 14 extends between a front end 18 and a rear end 20 of the base plate 12. One of the channels 14 receives the metal filings collected on the base plate 12 when the base plate 12 is tipped onto an associated one of the opposing sides 16 and the chop saw 1 is removed from the base plate 12 to facilitate clean up of the metal filings. Each of the channels 14 includes a vertical portion 22 and a horizontal portion 24. The horizontal portions 24 extend over the base plate 12.

Each of the channels 14 has one of a pair of side walls 26 coupled thereto and extending upwardly therefrom. Each of the side walls 26 is positioned adjacent a rear portion 2 of the chop saw 1 when the chop saw 1 is positioned on the base plate 12. A rear wall 28 is coupled to and extends upwardly from the rear end 20 of the base plate 12. The rear wall 28 is coupled to the side walls 26. The rear wall 28 and the side walls 26 deflect sparks towards the base plate 12 when the chop saw 1 is used to cut a metal work piece 3.

A lid 30 is hingedly coupled to the rear wall 28. The lid 30 extends between the side walls 26 when the lid 30 is positioned over the side walls 26. The lid 30 extends over the rear portion 2 of the chop saw 1 to deflect sparks onto the base plate 12. The lid 30 includes a plate portion 32 and an arcuate cowling 34 extending upwardly from the plate portion 32. The arcuate cowling 34 is positioned over a portion of a blade guard 4 of the chop saw 1. The arcuate cowling 34 is in contact with the blade guard 4 to pivot the lid 30 upwardly when the blade guard 4 is in a raised position.

In use, the base plate 12 is positioned on a support surface. The lid 30 is pivoted away from the side walls 26 and the chop saw 1 is positioned on the base plate 12 between the channels 14 with the rear portion 2 of the chop saw 1 positioned between the side walls 26. The lid 30 is pivoted back over the side walls 26 so that the arcuate cowling 34 extends over a portion of the blade guard 4 of the chop saw 1. As the blade guard 4 is lowered during the cutting of the metal work piece 3 the lid 30 lowers over the side walls 26 to contain the sparks and metal fillings being created by the chop saw 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A spark trap device for containing sparks created from a chop saw, said device comprising:
   a base plate receiving the chop saw, said base plate collecting the sparks from the chop saw;
   a pair of channels, each of said channels being coupled to opposing sides of said base plate, wherein the chop saw is positioned between said channels when the chop saw is positioned on said base plate, each of said channels extending between a front end and said rear end of said base plate, each of said channel including an elongated opening, said base plate forming a bottom wall of the elongated openings of said channels so that one of said channels receives metal filings collected on said base plate when said base plate is tipped onto an associated one of said opposing sides;
   a pair of side walls, each of said channels having one of said side walls coupled thereto and extending upwardly therefrom, each of said side walls being positioned adjacent a rear portion of the chop saw when said chop saw is positioned on said base plate;
   a rear wall being coupled to and extending upwardly from a rear end of said base plate, said rear wall being coupled to said side walls, said rear wall and said side walls deflecting sparks towards said base plate when the chop saw is used to cut a metal work piece; and
   a lid being hingedly coupled to said rear wall, said lid extending between said side walls when said lid is positioned over said side walls, said lid extending over the rear portion of the chop saw to deflect sparks onto said base plate.

2. The device according to claim 1, wherein each of said channels includes a vertical portion and a horizontal portion, said horizontal portions extending over said base plate.

3. The device according to claim 1, wherein said lid includes a plate portion and an arcuate cowling extending upwardly from said plate portion, said arcuate cowling being positioned over a portion of a blade guard of the chop saw, said arcuate cowling being in contact with the blade guard to pivot said lid upwardly when the blade guard is in a raised position.

4. A spark trap device for containing sparks created from a chop saw, said device comprising:
   a base plate receiving the chop saw, said base plate collecting the sparks from the chop saw;
   a pair of channels, each of said channels being coupled to opposing sides of said base plate, wherein the chop saw is positioned between said channels when the chop saw is positioned on said base plate, each of said channels extending between a front end and a rear end of said base plate, each of said channel including an elongated opening, said base plate forming a bottom wall of the elongated openings of said channels one of said channels receives metal filings collected on said base plate when said base plate is tipped onto an associated one of said opposing sides, each of said channels including a vertical portion and a horizontal portion, said horizontal portions extending over said base plate;
   a pair of side walls, each of said channels having one of said side walls coupled thereto and extending upwardly therefrom, each of said side walls being positioned adjacent a rear portion of the chop saw when said chop saw is positioned on said base plate;
   a rear wall being coupled to and extending upwardly from said rear end of said base plate, said rear wall being coupled to said side walls, said rear wall and said side walls deflecting sparks towards said base plate when the chop saw is used to cut a metal work piece;
   a lid being hingedly coupled to said rear wall, said lid extending between said side walls when said lid is positioned over said side walls, said lid extending over the rear portion of the chop saw to deflect sparks onto said base plate, said lid including a plate portion and an arcuate cowling extending upwardly from said plate portion, said arcuate cowling being positioned over a portion of a blade guard of the chop saw, said arcuate cowling being in contact with the blade guard to pivot said lid upwardly when the blade guard is in a raised position.

* * * * *